United States Patent
Ma et al.

(10) Patent No.: US 9,884,469 B2
(45) Date of Patent: Feb. 6, 2018

(54) LAMINATED PLASTIC SUBSTRATE, AND A PRODUCTION METHOD FOR THE SAME

(75) Inventors: Seung-Lac Ma, Chungju-si (KR); Dong-Ryul Kim, Daejeon (KR); Gi-Cheul Kim, Daejeon (KR); Sang-Uk Ryu, Daejeon (KR); Ho-Jun Lee, Daejeon (KR); Eun-Sil Lee, legal representative, Daejeon (KR); Jang-Yeon Hwang, Seoul (KR)

(73) Assignee: LG CHEM, LTD., Seoul (KR)

( * ) Notice: Subject to any disclaimer, the term of this patent is extended or adjusted under 35 U.S.C. 154(b) by 107 days.

(21) Appl. No.: 13/130,015

(22) PCT Filed: Nov. 19, 2009

(86) PCT No.: PCT/KR2009/006842
§ 371 (c)(1),
(2), (4) Date: Aug. 10, 2011

(87) PCT Pub. No.: WO2010/058988
PCT Pub. Date: May 27, 2010

(65) Prior Publication Data
US 2011/0287233 A1 Nov. 24, 2011

(30) Foreign Application Priority Data

Nov. 19, 2008 (KR) .................. 10-2008-0115390
Nov. 19, 2008 (KR) .................. 10-2008-0115392

(51) Int. Cl.
| | |
|---|---|
| B32B 27/08 | (2006.01) |
| B32B 27/18 | (2006.01) |
| B32B 27/32 | (2006.01) |
| B32B 27/36 | (2006.01) |
| C08J 7/12 | (2006.01) |
| B32B 7/12 | (2006.01) |
| B32B 27/28 | (2006.01) |
| B32B 27/30 | (2006.01) |
| B32B 27/38 | (2006.01) |
| B32B 27/42 | (2006.01) |
| G02F 1/1333 | (2006.01) |

(52) U.S. Cl.
CPC ............... *B32B 27/08* (2013.01); *B32B 7/12* (2013.01); *B32B 27/18* (2013.01); *B32B 27/281* (2013.01); *B32B 27/286* (2013.01); *B32B 27/308* (2013.01); *B32B 27/32* (2013.01); *B32B 27/36* (2013.01); *B32B 27/365* (2013.01); *B32B 27/38* (2013.01); *B32B 27/42* (2013.01); *C08J 7/123* (2013.01); *B32B 2250/40* (2013.01); *B32B 2264/10* (2013.01); *B32B 2270/00* (2013.01); *B32B 2307/306* (2013.01); *B32B 2307/7242* (2013.01); *B32B 2307/734* (2013.01); *B32B 2457/00* (2013.01); *B32B 2457/202* (2013.01); *G02F 2001/133302* (2013.01); *Y10T 428/24802* (2015.01); *Y10T 428/24975* (2015.01); *Y10T 428/26* (2015.01); *Y10T 428/31504* (2015.04); *Y10T 428/31507* (2015.04); *Y10T 428/31511* (2015.04); *Y10T 428/31721* (2015.04); *Y10T 428/31786* (2015.04)

(58) Field of Classification Search
None
See application file for complete search history.

(56) References Cited

U.S. PATENT DOCUMENTS

| | | | |
|---|---|---|---|
| 6,245,428 B1 | 6/2001 | Port et al. | |
| 6,322,860 B1 | 11/2001 | Stein et al. | |
| 6,465,953 B1 | 10/2002 | Duggal | |
| 6,503,634 B1 | 1/2003 | Utz et al. | |
| 6,632,535 B1 | 10/2003 | Buazza et al. | |
| 2002/0048678 A1 | 4/2002 | Hunia et al. | |
| 2002/0140890 A1* | 10/2002 | Hanada et al. | 349/122 |
| 2005/0014004 A1* | 1/2005 | King | B32B 27/08 428/413 |
| 2005/0175831 A1 | 8/2005 | Kim et al. | |
| 2005/0222298 A1* | 10/2005 | Rubinsztajn et al. | 523/404 |
| 2005/0272896 A1* | 12/2005 | Kaji et al. | 528/30 |
| 2006/0029811 A1* | 2/2006 | Sugioka et al. | 428/413 |
| 2006/0049532 A1* | 3/2006 | Puschner et al. | 257/788 |
| 2008/0213547 A1* | 9/2008 | Becker-Willinger et al. | 428/195.1 |
| 2009/0244452 A1* | 10/2009 | Yoshihara et al. | 349/115 |

FOREIGN PATENT DOCUMENTS

| | | |
|---|---|---|
| CN | 1918002 | 2/2007 |
| GB | 1596107 | 8/1981 |
| JP | 51-50941 | 5/1976 |
| JP | 05-148453 | 6/1993 |
| JP | 06-238853 | 8/1994 |
| JP | 10-16142 | 1/1998 |
| JP | 2000-290350 | 10/2000 |
| JP | 2004-238500 | 8/2004 |
| JP | 2005-342898 | 12/2005 |
| JP | 2007-523769 | 8/2007 |
| JP | 2008-165041 | 7/2008 |
| JP | 2008-186014 | 8/2008 |
| WO | 2004/039856 | 5/2004 |
| WO | WO 2005/074398 | 8/2005 |
| WO | WO2008075419 | * 6/2008 |

OTHER PUBLICATIONS

Daicel, CEL 2021P. Retrieved on Jun. 1, 2013. http://www.daicel.com/yuuki/product/index.php?act=detail&page=1&id=105.*

* cited by examiner

*Primary Examiner* — Coris Fung
(74) *Attorney, Agent, or Firm* — Dentons US LLP

(57) ABSTRACT

The present invention provides a multilayered plastic substrate that simultaneously satisfies improvement in high temperature thermal deformation according to low linear expansion coefficient and excellent dimensional stability and excellent gas barrier property, and is capable of being used instead of a glass substrate that has brittleness and heavy disadvantages without a problem caused by a difference in linear expansion coefficient between layers, and a method for manufacturing the same.

12 Claims, 1 Drawing Sheet

[Figure 1]
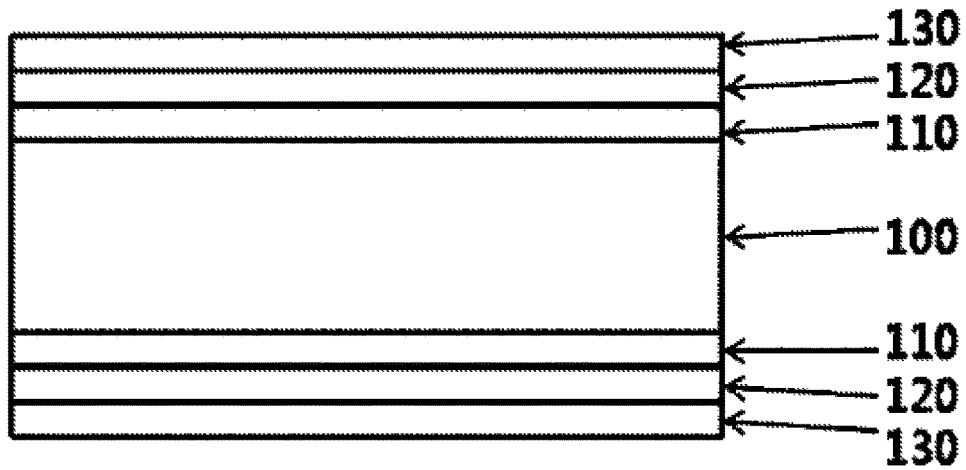
[Figure 2]
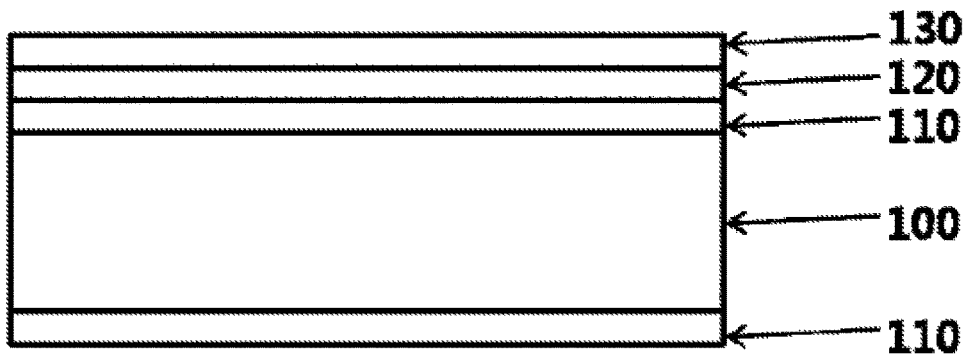
[Figure 3]
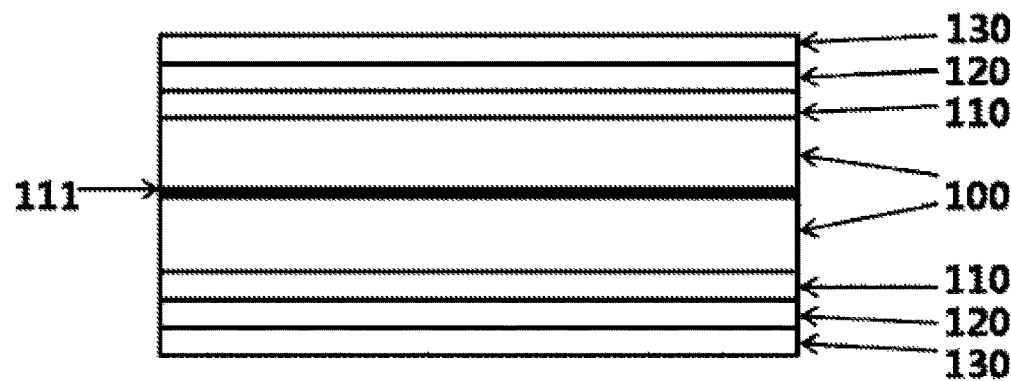

LAMINATED PLASTIC SUBSTRATE, AND A PRODUCTION METHOD FOR THE SAME

This application is a National Stage Entry of International Application No. PCT/KR2009/006842, filed Nov. 19, 2009, and claims the benefit of Korean Application Nos. 10-2008-0115390, and 10-2008-0115392, both filed on Nov. 19, 2008, which are hereby incorporated by reference for all purposes as if fully set forth herein.

TECHNICAL FIELD

The present invention relates to a multilayered plastic substrate and a method for manufacturing the same, and more particularly to a plastic substrate that has a multilayered structure in which high temperature thermal deformation and gas barrier property are improved, and a method for manufacturing the same.

BACKGROUND ART

A glass substrate that is used in a display device, a frame, a handicraft, a vessel and the like has various advantages such as small linear expansion coefficient, excellent gas barrier property, high optical transmissivity and surface flatness, excellent heat resistance and chemical resistance and the like, but has disadvantages because it is easily broken due to weakness to impact and heavy due to high density.

Currently, an interest for liquid crystals, organic light emitting display devices, and electronic paper is rapidly growing and many studies for replacing glass used as a substrate of the display device by plastic have been made. That is, if the glass substrate is replaced by the plastic substrate, the total weight of the display device becomes light, flexibility of design may be provided, and it is strong in respects to an impact, and in the case of when it is manufactured by using a continuous process, it may have economic efficiency as compared to the glass substrate.

Meanwhile, in order to use it as the plastic substrate of the display device, properties such as a high glass transition temperature that is capable of enduring a process temperature and a deposition temperature of a transparent electrode, oxygen and steam blocking property for preventing aging of liquid crystal and an organic light emitting material, a small linear expansion coefficient and dimensional stability for preventing distortion of a substrate according to a change in the process temperature, high mechanical strength that has high compatibility in respects to a process equipment used in a known glass substrate, chemical resistance that is capable of enduring an etching process, high optical transmissivity, small birefringence, and scratch resistance of a surface are required.

However, since there is no high performance polymer base film (including a polymer film and a polymer-inorganic material complex film) that satisfies all of these conditions, an effort for satisfying the above physical properties by performing functional coating several layers on the polymer base film has been made.

As an example of the representative coating layer, there are an organic flattening layer that provides flatness by lowering defects of the polymer surface, a gas barrier layer that includes an inorganic material for blocking gas such as oxygen and steam, and an organic or organic-inorganic hard coating layer for providing scratch resistance of the surface.

In the case of known many multilayered plastic substrates, they are subjected to a process for coating an inorganic material gas barrier layer on a polymer base and forming a hard coating layer on the gas barrier layer. When they are manufactured as the multilayered structure, there are problems in that the polymer base may be deformed, cracks may be generated on the inorganic thin film, and stripping may occur because there is a large difference in the linear expansion coefficients between the polymer base and the gas barrier layer. Accordingly, an attachment property between coating layers are very important.

Several organic-inorganic layers are manufactured by repeating a process for forming a monomer thin film on a polymer base film manufactured by Vitex Systems, Co., Ltd. in the USA, irradiating UV thereonto to perform the polymerization reaction such that polymerization is carried out (solidified organic layer), and shaping an inorganic thin film by using a sputtering method, and a flexible substrate that has excellent gas barrier property is manufactured.

However, even though a product that has excellent gas barrier property may be obtained by the above method, it is not useful to displays requiring low linear expansion coefficient, and they cannot suggest any solution in respects to this.

U.S. Pat. No. 6,465,953 discloses a method for dispersing getter particles that are capable of being reacted with inflow oxygen and steam on a plastic substrate in order to use the plastic substrate in an organic light emitting device that is sensitive to oxygen and steam. The size of the getter particle should be sufficiently smaller than the size of a specific wavelength of the emitted light and the particles should be uniformly dispersed so that emitted light is not scattered but penetrate the substrate. In addition, this method minimizes the amount of oxygen and steam that flow thereinto by coating a gas barrier film made of the inorganic material on the plastic substrate. However, in the above method, it is difficult to manufacture the substrate while nanoparticles having the size of 100 to 200 nm are uniformly dispersed, the thickness of the plastic substrate should be large in order to include a great amount of getter particles that are capable of being reacted with oxygen and steam, and the inorganic material gas barrier film is directly coated on the plastic substrate, such that cracks or stripping may occur on the gas barrier film because of a temperature change.

U.S. Pat. No. 6,322,860 discloses that a plastic substrate for displays is manufactured by coating a composition (a multifunctional acrylate-based monomer or oligomer, alkoxysilane, and a mixture thereof) that includes silica particles and the like and is capable of being crosslinked on one side or both sides of a polyglutimide sheet that has a thickness within 1 mm in some cases, photocuring or thermal curing it to manufacture a cross-linked coating film, coating a gas barrier film thereon, and in some cases, coating the cross-linked coating film on the barrier film. However, in the above method, only in the case of special cases, the oxygen transmissivity and the steam transmissivity are small enough to be used for liquid crystal display devices, but the low linear expansion coefficient and excellent dimensional stability that are necessarily required in order to use it instead of the glass substrate are not improved.

U.S. Pat. No. 6,503,634 discloses a multilayered film in which the oxygen transmissivity is ⅓₀₀ or less of the polymer base before the coating is carried out and the steam transmissivity is ¼₀₀ or less of the polymer base before the coating is carried out by coating ORMOCER that is an organic-inorganic hybrid and a silicon oxide layer on one polymer base or an intermediate layer of two polymer bases. However, the above method suggests that it can be used as a material for packing material because the oxygen and steam transmissivities are largely lowered as compared to the polymer base before the coating is carried out, but does not mention improvement in linear expansion coefficient and dimensional stability.

Japanese Patent Publication No. 1998-016142 discloses a gas barrier layering film in which a metal oxide layer, a ceramic layer that is formed from polysilazane, and a cured layer that is formed by using partial hydrolysis materials of alkoxysilane are sequentially layered. However, in this case, since the metal oxide is directly layered on the polymer film, there is a problem that is caused by a difference in linear expansion coefficient.

DISCLOSURE

Technical Problem

Therefore, it is an object of the present invention to provide a multilayered plastic substrate that simultaneously satisfies improvement in high temperature thermal deformation according to low linear expansion coefficient and excellent dimensional stability and excellent gas barrier property, and is capable of being used instead of a glass substrate that has brittleness and heavy disadvantages without a problem caused by a difference in linear expansion coefficient between layers, and a method for manufacturing the same. It is another object of the present invention to provide a multilayered plastic substrate that is used as a packing material requiring a gas barrier property and various vessel materials having various purposes in addition to a substrate of a display device.

Technical Solution

In order to accomplish the above objects, the present invention provides a multilayered plastic substrate that comprises a polymer base; first buffer layers that are disposed on an upper side and a lower side of the polymer base and includes a cured material by UV curing and thermal curing of a buffer composition capable of being UV cured and thermal cured; and a gas barrier layer and second buffer layer that are sequentially provided on one side of at least one first buffer layer among the first buffer layers that are formed on the upper side of the polymer base and the first buffer layers that are formed on the lower side of the polymer base. In the present invention, the polymer base may have a single layer structure or a structure in which two or more polymer layers are attached to each other.

In addition, the present invention provides a method for manufacturing a multilayered plastic substrate, which comprises the steps of (a) forming a first buffer layer by coating a buffer composition that is capable of being UV cured and thermal cured on a side of a polymer base; (b) UV curing the first buffer layer that is formed in the setep a); (c) forming the first buffer layer by coating a buffer composition that is capable of being UV cured and thermal cured on the other side of the polymer base on which the first buffer layer is provided on one side thereof; (d) UV curing the first buffer layer that is formed in the setep c); (d) simultaneously thermal curing the UV cured first buffer layers that are provided on both sides of the polymer base; and (e) sequentially forming a gas barrier layer and a second buffer layer on one side of at least one first buffer layer of the first buffer layers that are formed on both sides of the polymer base.

In addition, the present invention provides a method for manufacturing a multilayered plastic substrate, which comprises the steps of (a) forming a first buffer layer by coating a buffer composition that is capable of being UV cured and thermal cured on a side of a polymer base; (b) UV curing the first buffer layer; (c) thermal curing the UV cured first buffer layer; (d) forming a gas barrier layer on the first buffer layer; (e) forming a multilayered film that has a structure in which polymer base, first buffer layer, gas barrier layer and second buffer layer are sequentially layered by forming a second buffer layer on the gas barrier layer; (f) one further multilayered film that has the same structure as that of the step e) by repeating the steps (a) to (e); and (g) forming a multilayered film that has a symmetric structure by attaching the polymer base sides of the multilayered films that are manufactured in the steps (e) and (f) to each other.

In addition, the present invention provides an electronic device that includes a multilayered plastic substrate.

Advantageous Effects

Since a multilayered plastic substrate that has the above configuration according to the present invention simultaneously satisfies improvement in high temperature thermal deformation according to low linear expansion coefficient and excellent dimensional stability and excellent gas barrier property, it may be used instead of a glass substrate as a plastic substrate for display devices, and may be very usefully used as a material of a packing material and a vessel requiring a gas barrier property.

DESCRIPTION OF DRAWINGS

FIGS. 1 to 3 illustrate cross sections of a multilayered plastic substrate according to an embodiment of the present invention.

DESCRIPTION OF REFERENCE NUMERALS AND SIGNS

100: Polymer base
110: First buffer layer
120: Gas barrier layer
130: Second buffer layer
111: Attachment layer Best Mode The present invention provides a multilayered plastic substrate that comprises a polymer base; first buffer layers that are disposed on an upper side and a lower side of the polymer base and includes a cured material by UV curing and thermal curing of a buffer composition capable of being UV cured and thermal cured; and a gas barrier layer and second buffer layer that are sequentially provided on one side of at least one first buffer layer among the first buffer layers that are formed on the upper side of the polymer base and the first buffer layers that are formed on the lower side of the polymer base.

According to an embodiment of the present invention, as shown in FIG. 1, it may have a layering structure in which a second buffer layer 130, a gas barrier layer 120, a first buffer layer 110, a polymer base 100, a first buffer layer 110, the gas barrier layer 120 and the second buffer layer 130 are sequentially layered, but is not limited thereto.

According to another embodiment of the present invention, the gas barrier layer and the second buffer layer may be provided on one side of the first buffer layer that is formed on any one side of the upper side and the lower side of the polymer base. For example, as shown in FIG. 2, it may have a layering structure in which a first buffer layer 110, a polymer base 100, a first buffer layer 110, the gas barrier layer 120 and the second buffer layer 130 are sequentially layered, but is not limited thereto.

The polymer base, as shown in FIG. 1 or 2, may be a single layer structure, and according to an embodiment of the present invention, the polymer base may be a structure in which two or more polymer layers are attached to each other. For example, as shown in FIG. 3, it may have a layering structure in which a second buffer layer 130, a gas barrier layer 120, a first buffer layer 110, a polymer base 100, an attachment layer 111, polymer base 100, first buffer layer 110, gas barrier layer 120 and second buffer layer 130 are sequentially layered, but is not limited thereto.

It is preferable that the polymer base is a film or a sheet form that has a thickness in the range of 10 to 2,000 μm.

In the present invention, because of the first buffer layer that are treated by the UV curing treatment and the thermal curing treatment, stripping and bending phenomena caused by a difference in interlayer stress are improved, excellent gas barrier property is ensured, and there is no bending phenomenon at the high temperature even though it does not have a known laminate structure. Therefore, the polymer base may be constituted by a single layer. However, the polymer base may be a structure in which two or more polymer layers are attached to each other. If the attached polymer base is used, since the manufactured final multilayered plastic substrate has a vertical symmetric structure, the bending phenomenon of the film may be maximally suppressed.

In the case of when it is a structure in which two or more polymer layers are attached to each other, it may be manufactured by using a general acryl-based adhesive or thermal attachment method. At this time, in the case of when the adhesive is used, its content is not particularly limited, but it is preferable that the thickness of the attachment layer including the adhesive is in the range of 0.1 to 10 μm.

The polymer base may be manufactured through a solution casting method or a film extrusion process, and after the manufacturing, in order to minimize deformation according to the temperature, it may be annealed for several seconds to several minutes at about the glass transition temperature. After the annealing, in order to improve the coating property and the attachment property, the surface of the polymer base may be primer coated, or surface treated by using a plasma treatment using oxygen or carbon dioxide, UV-ozone treatment, an ion beam treatment where a reaction gas is introduced and the like.

As the polymer base, one or more kinds that are selected from the group consisting of a homopolymer, a polymer blend of two or more kinds, and a polymer complex material that includes organic or inorganic additives may be selected and used.

As a preferable example of the polymer, in the case of when the multilayered film according to the present invention is used as the substrate of the liquid crystal display device, since the manufacturing process for forming the thin film transistor and the transparent electrode is carried out at the high temperature of 200° C. or more, it is preferable to use the polymer that has heat resistance enduring the high temperature. As the polymer that has the above properties, there are polynorbornene, aromatic fluorene polyester, polyethersulfone, bisphenol-A polysulfone, polyimide and the like. In addition, while a current study for lowering the high temperature substrate process temperature to the low temperature is performed, since the temperature of about 150° C. is capable of being used, polymers such as polyethyleneterephthalate, polyethylenenaphthalene, polyarylate, polycarbonate, cyclic olefine copolymer and the like may be used.

In addition, the polymer base is a polymer in which nanomaterials are dispersed, and a polymer complex material that includes organic or inorganic additives may be used.

As the polymer complex material, there is a polymer-clay nanocomplex in which nanomaterials are dispersed in a polymer matrix. The polymer-clay nanocomplex may improve physical properties such as mechanical properties, heat resistance, gas barrier property, dimensional stability and the like of the polymer by using a small amount of clay as compared to a known complex such as glass fibers because of small particle size (<1 μm) and a large aspect ratio of the clay. That is, in order to improve the above physical properties, it is important to well disperse the clay layers in the polymer matrix by stripping the multilayered clay layers, and the polymer-clay nanocomplex can satisfy this.

As the polymer that is capable of being used in the polymer-clay nanocomplex, polystyrene, polymethacrylate, polyethyleneterephthalate, polyethylenenaphthalene, polyarylate, polycarbonate, cyclic olefine copolymer, polynorbornene, aromatic fluorene polyester, polyethersulfone, polyimide, epoxy resin, multifunctional acrylate and the like may be used, and laphonite, montmorylonite, megadite and the like may be used as the clay.

The first buffer layer eases a large difference in linear expansion coefficients between the polymer base and the gas barrier layer, and improves an attachment ability between the polymer base and the gas barrier layer. In addition, the first buffer layer may flatten the surface of the polymer base, such that defects formed while the gas barrier layer is deposited may be minimized.

In the present invention, the first buffer layer includes UV cured and thermal cured material, and the content of the uncured epoxy group after the curing is 10 wt % or more and less than 100 wt %, preferably 30 wt % to 95 wt %, and more preferably 50 wt % to 90 wt %.

For example, the buffer layer may include a cured material by UV curing and thermal curing of a mixture of at least one hydrolysis material of organic silane and metal alkoxide and a curable epoxy resin. Herein, on the basis of 100 parts by weight of the cured material, it is preferable that at least one hydrolysis material of organic silane and metal alkoxide is 5 to 95 parts by weight and the curable epoxy resin is 5 to 95 parts by weight.

The first buffer layer may be formed by coating the buffer composition that is capable of being UV cured and thermal cured on the polymer base and UV curing and thermal curing it. In detail, it may be manufactured by partially hydrolyzing at least one of organic silane and metal alkoxide to manufacture a composition in a sol state, mixing it with the curable epoxy resin, and coating it on the polymer base, and it is UV cured and thermal cured.

As the organic silane, if any one includes the the organic silane, it is not particularly limited, and the organic silane may include one or more selected from the group consisting of the compounds that are represented by the following Formula 1 to 3. As the metal alkoxide, if any one includes the metal alkoxide, it is not particularly limited, and the metal alkoxide may include at least one or more selected from the group consisting of the compounds that are represented by the following Formula 4. As the curable epoxy resin, if any one includes the epoxy group, it is not particularly limited, and the curable epoxy resin may include at least one or more selected from the group consisting of an alicyclic epoxy resin that is represented by the following Formula 5 to 10 and triglycidyl isocyanurate that is represented by the following Formula 11.

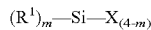  [Formula 1]

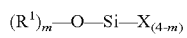  [Formula 2]

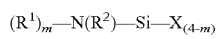  [Formula 3]

In Formula 1 to Formula 3,

X may be each independently the same as or different from each other, and hydrogen, halogen, alkoxy having 1 to 12 carbon atoms, acyloxy, alkylcarbonyl, alkoxycarbonyl, or $-N(R^2)_2$, R1 may be each independently the same as or different from each other, alkyl having 1 to 12 carbon atoms, alkenyl having 2 to 12 carbon atoms, alkynyl, aryl having 6 to 20 carbon atoms, arylalkyl, alkylaryl, arylalkenyl, alkenylaryl, arylalkynyl, alkynylaryl, halogen, amide, aldehyde, ketone, alkylcarbonyl, carboxy, mercapto, cyano, hydroxy, alkoxy having 1 to 12 carbon atoms, alkoxycarbonyl having 1 to 12 carbon atoms, sulfonic acid, phosphoric acid, acryloxy, methacryloxy, epoxy, or vinyl group, R2 is hydrogen, or alkyl having 1 to 12 carbon atoms, m is an integer in the range of 1 to 3.

$M-(R^3)_z$  [Formula 4]

wherein M is a metal that is selected from the group consisting of aluminum, zirconium and titanium, $R^3$ may be each independently the same as or different from each other and halogen, alkyl having 1 to 12 carbon atoms, alkoxy, acyloxy, or hydroxyl group, Z is an integer of 3 or 4.

[Formula 5]

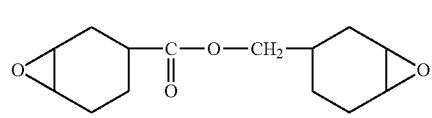

[Formula 6]

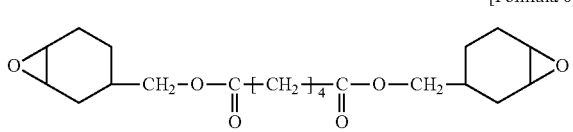

[Formula 7]

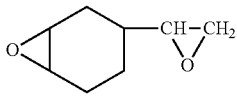

[Formula 8]

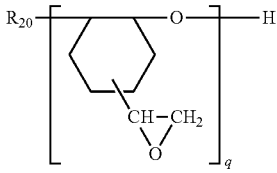

wherein $R_{20}$ is alkyl group or trimethylolpropane residual group and q is in the range of 1 to 20.

[Formula 9]

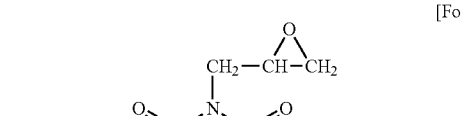

wherein $R_{21}$ and $R_{22}$ may be the same as or different from each other and each H or $CH_3$, and r is in the range of 0 to 2.

[Formula 10]

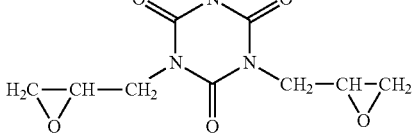

wherein s is in the range of 0 to 2.

[Formula 11]

The first buffer composition for forming the first buffer layer may include organic silane and metal alkoxide alone or in a mixture form, and the contents of the organic silane and metal alkoxide are in the range of 5 to 95 parts by weight on the basis of 100 parts by weight of the buffer composition.

The curable epoxy resin may be used in the amount of 5 to 95 parts by weight on the basis of 100 parts by weight of the buffer composition, and on the basis of 100 parts by weight of the buffer composition, it may further include a curing agent in the amount of 1 to 90 parts by weight. In addition, the curable epoxy resin may further include a catalyst in the amount of 0.1 to 20 parts by weight on the basis of 100 parts by weight of the buffer composition.

It is preferable that the step for preparing the curable epoxy resin includes the steps of mixing 1 to 90 parts by weight of the curing agent on the basis of 100 parts by weight of the buffer composition and 0.1 to 20 parts by weight of the catalyst on the basis of 100 parts by weight of the buffer composition with each other; and the curing agent to which the catalyst is added and 1 to 95 parts by weight of the epoxy resin on the basis of 100 parts by weight of the buffer composition. It is more preferable that the transparent curable epoxy resin is manufactured by mixing 91 parts by weight of the epoxy curing agent and 1 parts by weight of the catalyst with each other, heating them, agitating them for 30 min, agitating 50 parts by weight of epoxy for 10 min, mixing the curing agent to which the catalyst is added and the melted epoxy with each other, and agitating them.

The epoxy resin may include a compound that is selected from an alicyclic epoxy resin that is represented by Formulas 5 to 10 and triglycidyl isocyanurate that is represented by Formula 11 alone or in a combination of two or more thereof. The combination may include another epoxy resin in order to control reflectivity so that reflectivities of the resin combination and if necessary the glass filling agent are the same as each other.

As the curing agent, the acid anhydride curing agent is preferable, and for example, one or more kinds selected from the group consisting of phthalic anhydride, maleic anhydride, trimellitic anhydride, pyromellitic anhydride, hexahydrophthalic anhydride, tetrahydrophthalic anhydride, methylnatic anhydride, nadic anhydride, glutaric anhydride, methylhexahydro phthalic anhydride, methyltetrahydrophthalic anhydride, hydrogenated methylnadic anhydride and hydrogenated nadic anhydride may be used. In particular, methylhexahydrophthalic anhydride and hydrogenated methylnadic anhydride are preferable in terms of transparency.

In the catalyst, as the curing promoting agent, a compound that is selected from the group consisting of an organic acid that is a cationic catalyst that includes acetic acid, benzoic acid, salicylic acid, para-toluenesulfonic acid, boron trifluoride-amine complex, boron trifluoride ammonium salt, aromatic diazonium salt, aromatic sulfonium salt, aromatic iodonium salt and aluminum complex-containing cationic catalyst and the like; tertiary amine such as 1,8-diazabicyclo[5.4.0]undecene-7 and triethylenediamine; imidazole such as 2-ethyl-4-methylimidazole; a phosphorus compound such as triphenylphosphin and tetraphenylphosphinium; tetraphenyl borate; quaternary ammonium salt; organic metal salt; and a derivative thereof may be used alone or in a combination of two or more thereof.

The first buffer composition may be manufactured from the exemplified compounds, and in some cases, the filling agent and the solvent may be further added to the composition.

The filling agent may be one or more selected from the group consisting of metal, glass powder, diamond powder, silicon oxide, clay, calcium phosphate, magnesium phosphate, barium sulphate, aluminum fluoride, calcium silicate, magnesium silicate, barium silicate, barium carbonate, barium hydroxide, and aluminum silicate.

The solvent is not particularly limited if it is a solvent that has compatibility or solubility with epoxy, the curing agent and catalyst, and it may be one or more selected from the group consisting of methylene chloride methylene chloride, dichloroethane, dioxane, acetone, methylethylketone, methylisobutylketone, methanol, ethanol, propanol and isopropanol.

The amount of the used filling agent and the solvent are not particularly limited because they are added according to the necessity.

A plastic film in which deformation is minimized while thermal curing is carried out and a flat surface is ensured at a high temperature may be provided by forming the first buffer layer using the above materials.

The UV curing of the buffer composition is not particularly limited if the radical reaction is accomplished by the UV light source, but it is preferable to use the mercury or metal halide lamp alone or in a combination thereof. The surface hardness of the first buffer layer may be increased by the UV curing.

The first buffer layer eases a large difference in linear expansion coefficients between the polymer base and the gas barrier layer, and improves an attachment ability between the polymer base and the gas barrier layer. In addition, the first buffer layer may flatten the surface of the polymer base, such that defects formed while the gas barrier layer is deposited may be minimized.

The second buffer layer is not particularly limited, but it may be formed of the same composition as the composition of the first buffer layer. One or more partial hydrolysis materials of organic silane that is selected from the group consisting of the compounds that are represented by Formulas 1 to 3 may be used, the composition that is obtained by partially hydrolyzing at least one of one or more organic silanes that is selected from the group consisting of the compounds that are represented by Formulas 1 to 3 and one or more metal alkoxides that are selected from the group consisting of the compounds that are represented by Formula 4 may be used, or the composition that is obtained by partially hydrolyzing at least one of one or more organic silanes that is selected from the group consisting of the compounds that are represented by Formulas 1 to 3 and one or more metal alkoxides that are selected from the group consisting of the compounds that are represented by Formula 4, the alicyclic epoxy resin that is represented by Formulas 5 to 10, and the curable epoxy resin that includes triglycidyl isocyanurate that is represented by Formula 11 and the like may be used to manufacture it.

The second buffer composition for forming the second buffer layer may be manufactured from the exemplified compounds, and in some cases, the filling agent and the solvent may be further added to the composition.

The filling agent may be one or more selected from the group consisting of metal, glass powder, diamond powder, silicon oxide, clay, calcium phosphate, magnesium phosphate, barium sulphate, aluminum fluoride, calcium silicate, magnesium silicate, barium silicate, barium carbonate, barium hydroxide, and aluminum silicate.

Another embodiment of the present invention provides a method for manufacturing a multilayered plastic substrate, which comprises the steps of (a) forming a first buffer layer by coating a buffer composition that is capable of being UV cured and thermal cured on a side of a polymer base; (b) UV curing the first buffer layer that is formed in the step a); (c) forming the first buffer layer by coating a buffer composition that is capable of being UV cured and thermal cured on the other side of the polymer base on which the first buffer layer is provided on one side thereof; (d) UV curing the first buffer layer that is formed in the step c); (d) simultaneously thermal curing the UV cured first buffer layers that are provided on both sides of the polymer base; and (e) sequentially forming a gas barrier layer and a second buffer layer on one side of at least one first buffer layer of the first buffer layers that are formed on both sides of the polymer base.

Another embodiment of the present invention provides a method for manufacturing a multilayered plastic substrate, which comprises the steps of (a) forming a first buffer layer by coating a buffer composition that is capable of being UV cured and thermal cured on a side of a polymer base; (b) UV curing the first buffer layer; (c) thermal curing the UV cured first buffer layer; (d) forming a gas barrier layer on the first buffer layer; (e) forming a multilayered film that has a structure in which polymer base, first buffer layer, gas barrier layer and second buffer layer are sequentially layered by forming a second buffer layer on the gas barrier layer; (f) one further multilayered film that has the same structure as that of the step e) by repeating the steps (a) to (e); and (g) forming a multilayered film that has a symmetric structure by attaching the polymer base sides of the multilayered films that are manufactured in the steps (e) and (f) to each other.

The coating method of the first buffer layer is not particularly limited, and methods such as spin coating, roll coating, bar coating, dip coating, gravure coating, and spray coating and the like may be used but it is not limited thereto.

It is preferable that the thickness of the first buffer layer is in the range of 0.1 to 50 µm after the curing. If the thickness is less than 0.1 µm, hindrance may easily occur because of pin hole defects, and leakage current may occur, and in the case of when the thickness is more than 50 µm, a distortion phenomenon of a film may occur during the curing, and there is a problem in flatness defect because surface unevenness is formed.

The flatness Ra (average of roughness) of the first buffer layer is very important. If the first buffer layer is not flat, when the gas barrier layer is deposited, defects may be formed, thus lowering the barrier property.

In order to solve the above problems, the surface flatness of the first buffer layer is preferably about 1 nm, and more preferably within 1 nm. In detail, the surface flatness may have the Ra value of 0.1 to 1.2 nm.

In the manufacturing method, the UV curing is not particularly limited if the radical reaction is accomplished by the UV light source, but it is preferable to use the mercury or metal halide lamp alone or in a combination thereof. For example, the UV curing may be carried out in energy of 20 mJ/cm$^2$ to 3000 mJ/cm$^2$ for 1 sec to several hours, for example, 1 min or less. Meanwhile, the thermal curing may be carried out, for example, at a temperature of 100 to 200° C. for 1 min to several hours, for example, for 1 hour or less, preferably 10 to 20 min.

The gas barrier layer is a high density inorganic material layer that has a small linear expansion coefficient, and may block gas such as oxygen and steam.

It is preferable that the gas barrier layer is formed of one or more inorganic materials that are selected from the group consisting of $SiO_x$ (herein x is an integer in the range of 1 to 4), $SiO_xN_y$ (herein x and y are each an integer in the range of 1 to 3), $Al_2O_3$, and ITO.

It is preferable that the thickness of the gas barrier layer is in the range of 5 to 1,000 nm. If the thickness is less than 5 nm, a dispersion state of layered scattered material including silicon oxide is not sufficient, a maze effect that is a requirement for accomplishing the gas barrier property or uniformity of the gas barrier layer is damaged, such that it is difficult to obtain the high oxygen barrier property. In addition, in consideration of accomplishment of the gas barrier property and the prevention of generation of cracks during the handling, it is preferable that the thickness is not more than 1000 nm.

As the method for forming the gas barrier layer, since the oxygen transmissivity and the steam transmissivity of the polymer base have the value of several tens to several thousands unit, a method for blocking oxygen and steam by depositing and coating the transparent inorganic material having the high density or the metal thin film of nanometer unit on the polymer film by using the physical or chemical method may be used.

At this time, in the case of the transparent inorganic material oxide thin film, if there are pin holes or cracks, it is difficult to obtain a sufficient oxygen and steam barrier effect, and in the case of the metal thin film, it is difficult to obtain the uniform thin film having no defects and the thickness of several nanometers, and it is difficult to make the optical transmissivity at a visible ray region be more than 80%. Therefore, the thickness of the gas barrier layer that is formed through the above method is in the range of 5 to 1,000 nm, preferably 10 to 500 nm, and more preferably 10 to 300 nm.

As the deposition coating method, a sputtering method, a chemical deposition method, an ion plating method, a plasma chemical deposition method, a sol-gel method and the like may be used.

In addition, since a hydration reaction between the hydroxy group of the gas barrier layer and the hydroxy group of the first buffer layer and second buffer layer may occur, defects of the gas barrier layer may be removed and the gas barrier property may be more improved.

The composition of the second buffer layer that is layered on the gas barrier layer is not particularly limited. That is, a general composition for organic coating using acryl, organic silane, metal alkoxide, organic and inorganic hybrid composition, and the first buffer composition may be used, and the coating thickness may vary according to the necessity.

The second buffer layer may be coated on the gas barrier layer by using the method such as spin coating, roll coating, bar coating, dip coating, gravure coating, and spray coating and the like.

If the curing method of the second buffer layer may be efficiently carried out by using methods such as thermal curing, UV curing, IR curing and high frequency heat treatment, the method is not limited.

The thickness of the second buffer layer after the curing may be in the range of 0.1 to 50 µm, preferably 0.2 to 10 µm, and more preferably 0.5 to 20 µm. In the case of when the thickness is less than 0.1 µm, it is impossible to provide sufficient chemical resistance and scratch resistance, and in the case of when the thickness is more than 50 µm, a role of a protective layer for preventing generation of cracks of the gas barrier layer is not sufficiently carried out.

In the present invention, the flatness of the second buffer layer is very important, and since devices such as ITO that is used in an LCD process or OLED process are directly deposited on the second buffer layer, these devices cannot function as normal because of a phenomenon where current is concentrated if the flatness of the second buffer layer is high. Currently, more excellent flatness is required in OLED that is the next display rather than LCD. In order to satisfy the above requirements, the surface flatness of the second buffer layer is preferably about 1 nm, and more preferably within 1 nm. In detail, the flatness may have the Ra value of 0.1 to 1.2 nm.

As described above, in the multilayered plastic substrate according to the present invention, since the surface hardness is improved in a moment by UV curing to minimize the deformation during the thermal curing, the linear expansion coefficient has a very small value of 6.5 ppm/K or less. The linear expansion coefficient of the multilayered plastic substrate according to the present invention may be in the range of 5 to 30 ppm/K and more preferably 6 to 20 ppm/K. In addition, the multilayered plastic substrate according to the present invention may have the pencil hardness of 2 or more and preferably in the range of 2H to 8H. In addition, in the multilayered plastic substrate according to the present invention, the oxygen transmissivity is preferably less than 0.05 cc/m²/day/atm, the optical transmissivity is preferably 85% or more and the steam transmissivity is less than 0.005 g/m²/day. In the multilayered plastic substrate according to the present invention, since the oxygen transmissivity is less than 0.05 cc/m²/day/atm, and the steam transmissivity is less than 0.005 g/m²/day, the excellent gas barrier property may be implemented.

Therefore, the multilayered plastic substrate according to the present invention may be used instead of the heavy glass substrate that is mainly used in a known display device and easily broken, and may be used as a material that requires excellent gas barrier property.

In addition, another embodiment of the present invention provides an electronic device that includes the multilayered plastic substrate. The multilayered plastic substrate according to the present invention may be used as a substrate of an image display device or a cover material of a display device.

The electronic device including the image display device may be manufactured by using a general method that is known in the art.

Mode for Invention

Hereinafter, the present invention will be described in more detail by using the following Examples. The following Examples are set forth to illustrate but are not to be construed to limit the present invention.

EXAMPLE 1-1

After 20 parts by weight of tetraethoxysilane (TEOS), and 10 parts by weight of glycidoxypropyltrimethoxysilane (GPTMS) were mixed with each other, 7 parts by weight of distilled water, 20 parts by weight of ethanol and 0.01 parts by weight of HCl were added thereto, the sol that was manufactured by hydrolyzing them at 25° C. for 24 hours was mixed with 100 parts by weight of ERL-4221 that was the trademark of the epoxy compound (Dow Chemical), and 6 parts by weight of triarylsulfonium hexafluoro antimonite salts mixed 50 w % in propylene carbonate that was the catalyst, thereby preparing the organic-inorganic hybrid buffer composition.

The buffer composition was subjected to the bar coating on one side of the PET that was the base, the solvent was removed in the convection oven at 90° C. for 5 min, the UV curing was carried out, the bar coating was carried out the other side of the PET, the solvent was removed in the convection oven at 90° C. for 5 min, the UV curing was carried out, the first buffer layer was formed on both sides of the PET, and the thermal curing was carried out in the convection oven at 150° C. for 1 hour.

Thereafter, on one side of the first buffer layer that was subjected to the thermal curing, in order to form the gas barrier layer, 50 sccm of the Ar gas was injected by using the DC/RF magnetron sputter manufactured by Atech System, Co., Ltd., it was deposited for 10 min by RF power (13.56 MHz) of 1000 Watt under the pressure of 5 mtorr, thus depositing the silicon oxide (SiOx, x=an integer of 1 to 4) thin film. The thickness of the silicon oxide film that was observed by SEM was 100 nm. After the multilayered film was manufactured by bar coating the buffer composition on the silicon oxide thin film, removing the solvent for 5 min in the convection oven at 90° C., carrying out the UV curing, and carrying out the thermal curing for 1 hour in the convection oven at 150° C. to form the second buffer layer. At this time, after the curing was finished, the thickness of the second buffer layer that was measured by using the alpha stepper was 0.5 micron. The surface roughness of the second buffer layer that was measured by using AFM tapping mode at normal temperature was 0.4 nm or less in the measurement area of 50 micron×50 micron.

After that, on the other side of the first buffer layer that was subjected to the thermal curing by using the same method as the above, the gas barrier layer and the second buffer layer were sequentially formed.

When the substrate according to Example 1-1 was put on the flat bottom, there were no bumps. In respects to the plastic substrate of Example 1-1, optical transmissivity, oxygen transmissivity, steam transmissivity, linear expansion coefficient, and pencil hardness that were main required physical properties as a substrate for display devices were measured, and the results are described in Table 1. The physical properties measurement method was the same as the following method, and they were applied to all the following Examples and Comparative Examples in the same manner.

1) optical transmissivity: On the basis of ASTM D1003, the measurement was carried out by using the UV-spectroscopy manufactured by Varian Co., Ltd. at a visible ray region in the range of 380 to 780 nm.

2) oxygen transmissivity: The relative humidity of 0% was measured at normal temperature by using OX-IRAN 2/20 manufactured by MOCON, Co., Ltd. according to the ASTM D 3985 method.

3) steam transmissivity: The relative humidity of 100% was measured at normal temperature for 48 hours by using PERMATRAN-W-3/33 according to the ASTM F 1249 method.

4) linear expansion coefficient: On the basis of ASTM D696, the measurement was carried out by using the thermomechnical analysis (TMA) under the stress of 5 gf while the temperature was increased at the rate of 10° C. per minute, and the pencil hardness was measured under a load of 200 g by the ASTM D3363 method.

The average value was obtained in respects to at least five measured values so that all described physical properties have statistical representativities.

For reference, the oxygen and steam transmissivity of the PET film used in Example 1-1 were 25 cc/m²/day/atm, and 4.5 g/m²/day, respectively, and the linear expansion coefficient was 22.4 ppm/K.

EXAMPLE 1-2

The buffer composition was prepared by using the same method as Example 1-1, except that 10 parts by weight of anhydride (MH700G, New Japan Chemical) that was the curing agent was further added, and the multilayered plastic substrate having the same structure was manufactured. The physical properties of the manufactured multilayered plastic substrate were measured, and they are described in Table 1.

EXAMPLE 1-3

The buffer composition was prepared by using the same method as Example 1-1, except that 80 parts by weight of tetraethoxysilane, and 10 parts by weight of glycidoxypropyltrimethoxysilane were mixed with each other, 28 parts by weight of distilled water, 80 parts by weight of ethanol and 0.04 parts by weight of HCl were added thereto, and the multilayered plastic substrate having the same structure was manufactured. The physical properties of the manufactured multilayered plastic substrate were measured, and they are described in Table 1.

EXAMPLE 1-4

The buffer composition was prepared by using the same method as Example 1-1, except that 30 parts by weight of colloidal silica (MIBK-ST) was further added, and the multilayered plastic substrate having the same structure was manufactured. The physical properties of the manufactured multilayered plastic substrate were measured, and they are described in Table 1.

EXAMPLE 1-5

The buffer composition was prepared by using the same method as Example 1-1, except that 10 parts by weight of metal alkoxide [Al(OBu)3] was further added, 10 parts by weight of distilled water, 30 parts by weight of ethanol and 30 parts by weight of colloidal silica (MIBK-ST) were further added, and the multilayered plastic substrate having the same structure was manufactured. The physical properties of the manufactured multilayered plastic substrate were measured, and they are described in Table 1.

EXAMPLE 1-6

The buffer composition was prepared by using the same method as Example 1-1, except that the gas barrier layer and the second buffer layer were formed only on one side of the PET. The physical properties of the manufactured multilayered plastic substrate were measured, and they are described in Table 1.

COMPARATIVE EXAMPLE 1-1

The plastic substrate having the same structure was manufactured by using the buffer coating composition that was prepared by using the same method as Example 1-1. However, the curing of the buffer coating composition was carried out by using only the thermal curing without the UV curing at 120° C. for 1 hour.

However, if the thermal curing was carried out after the first buffer layer was coated on one side of the PET film, since the symmetric structure was not obtained in the thickness direction of the film, a curl phenomenon occurred while the curing was carried out, and if the gas barrier layer and the second buffer layer were sequentially formed, it could be confirmed that the curl phenomenon became more serious. The physical properties of the manufactured multilayered plastic substrate were measured, and they are described in Table 1.

COMPARATIVE EXAMPLE 1-2

The plastic substrate having the same structure was manufactured by using the buffer coating composition that was prepared by using the same method as Example 1-1. However, the curing of the buffer coating composition was achieved by removing the solvent in the convection oven at 90° C. for 5 min, and carrying out the UV curing, and the thermal curing step was omitted.

In the case of when only the UV curing was carried out, the curing was not completely carried out, and thus, an attachment ability between the interfaces was lowered, such that the coated film having the low physical properties such as pencil hardness was manufactured.

The physical properties of the manufactured multilayered plastic substrate were measured, and they are described in Table 1. In Table 1, the measurement range of device a) was 0.05 cc/m$^2$/day/atm, and the measurement range of the device b) was 0.005 g/m$^2$/day.

TABLE 1

| | Oxygen transmissivity[a] (cc/m$^2$/day/atm) | Oxygen transmissivity[b] (g/m$^2$/day) | Linear expansion coefficient (ppm/K) | Light transmissivity (400 nm) | Pencil hardness (200 g load) | Degree of bending | Note |
|---|---|---|---|---|---|---|---|
| Example 1-1 | <0.05 | <0.005 | 10 | 89% | 3H | No | — |
| Example 1-2 | <0.05 | <0.005 | 12 | 87% | 3H | No | Addition of the curing agent |
| Example 1-3 | <0.05 | <0.005 | 11 | 89% | 4H | No | Change of the composition |
| Example 1-4 | <0.05 | <0.005 | 12 | 87% | 4H | No | Addition of the inorganic material |
| Example 1-5 | <0.05 | <0.005 | 11 | 89% | 3H | No | Addition of the metal catalyst and the inorganic material |
| Example 1-6 | <0.05 | 0.009 | 14 | 89% | 4H | No | Change of the structure |
| Comparative Example 1-1 | 0.30 | 0.08 | 16 | 80% | 4B | Serious | Performance of only thermal curing |
| Comparative Example 1-2 | 0.26 | 0.05 | 18 | 83% | H | Serious | Performance of only UV curing |

Through Table 1, in the case of Examples 1-1 to 1-6 according to the present invention, as compared to Comparative Examples 1-1 to 1-2, the oxygentransmissivity, steam transmissivity and linear expansion coefficient were low, the optical transmissivity was high, pencil hardness was excellent, and there was no deformation such as the curl phenomenon.

As described above, according to the present invention, it is possible to provide a multilayered plastic substrate that simultaneously satisfies improvement in high temperature thermal deformation according to low linear expansion coefficient and excellent dimensional stability and excellent gas barrier property.

EXAMPLE 2-1

After 20 parts by weight of tetraethoxysilane (TEOS), and 10 parts by weight of glycidoxypropyltrimethoxysilane (GPTMS) were mixed with each other, 7 parts by weight of distilled water, 20 parts by weight of ethanol and 0.01 parts by weight of HCl were added thereto, the sol that was manufactured by hydrolyzing them at 25° C. for 24 hours was mixed with 100 parts by weight of ERL-4221 that was the trademark of the epoxy compound (Dow Chemical), and 6 parts by weight of triarylsulfonium hexafluoro antimonite salts mixed 50 w % in propylene carbonate that was the catalyst, thereby preparing the organic-inorganic hybrid buffer composition.

After the buffer composition was bar coated on one side of the PET that was the base, the solvent was removed in the convection oven at 90° C. for 5 min, the UV curing was carried out, and the thermal curing was carried out in the convection oven at 1200° C. for 1 hour, thus coating the first buffer layer on one side of the PET film. On the first buffer layer that was subjected to the curing, 50 sccm of the Ar gas was injected by using the DC/RF magnetron sputter manufactured by Atech System, Co., Ltd., it was deposited for 10 min by RF power (13.56 MHz) of 1000 Watt under the pressure of 5 mtorr, thus depositing the silicon oxide (SiOx, x=an integer of 1 to 4) thin film. The thickness of the silicon oxide film that was observed by SEM was 100 nm. After the multilayered film was manufactured by bar coating the buffer composition on the silicon oxide thin film, removing the solvent for 5 min in the convection oven at 90° C., carrying out the UV curing, and carrying out the thermal curing for 1 hour in the convection oven at 120° C. to form the second buffer layer. At this time, after the curing was finished, the thickness of the second buffer layer that was measured by using the alpha stepper was 0.5 micron. The surface roughness of the second buffer layer that was measured by using AFM tapping mode at normal temperature was 0.4 nm or less in the measurement area of 50 micron×50 micron.

Thereafter, the multilayered film was manufactured once more by using the method as described above.

Finally, the attaching agent composition that was mainly composed of acrylate oligomer having the multifunctional groups was bar coated on the PET side of the multilayered film 100b that was manufactured by using the above process and was not coated, the polymer base of the multilayered film 100b that was manufactured by using the same method was combined therewith, UV was irradiated by using the UV irradiating device (DYMAX 2000-EC) for 6 min to induce the curing reaction of the attaching agent composition, thereby manufacturing the plastic substrate having the symmetric structure.

When the substrate according to Example 2-1 was put on the flat bottom, there were no bumps. In respects to the plastic substrate of Example 2-1, optical transmissivity, haze, oxygen transmissivity, steam transmissivity, linear expansion coefficient, and pencil hardness that were main required physical properties as a substrate for display devices were measured, and the results are described in Table 2.

EXAMPLE 2-2

The buffer composition was prepared by using the same method as Example 2-1, except that 10 parts by weight of anhydride (MH700G, New Japan Chemical) that was the curing agent was further added, and the multilayered plastic substrate having the same structure was manufactured. The physical properties of the manufactured multilayered plastic substrate were measured, and they are described in Table 2.

EXAMPLE 2-3

The buffer composition was prepared by using the same method as Example 2-1, except that 80 parts by weight of tetraethoxysilane, and 10 parts by weight of glycidoxypropyltrimethoxysilane were mixed with each other, 28 parts by weight of distilled water, 80 parts by weight of ethanol and 0.04 parts by weight of HCl were added thereto, and the multilayered plastic substrate having the same structure was manufactured. The physical properties of the manufactured multilayered plastic substrate were measured, and they are described in Table 2.

EXAMPLE 2-4

The buffer composition was prepared by using the same method as Example 2-1, except that 30 parts by weight of colloidal silica (MIBK-ST) was further added, and the multilayered plastic substrate having the same structure was manufactured. The physical properties of the manufactured multilayered plastic substrate were measured, and they are described in Table 2.

EXAMPLE 2-5

The buffer composition was prepared by using the same method as Example 2-1, except that 10 parts by weight of metal alkoxide [Al(OBu)3] was further added, 10 parts by weight of distilled water, 30 parts by weight of ethanol and 30 parts by weight of colloidal silica (MIBK-ST) were further added, and the multilayered plastic substrate having the same structure was manufactured. The physical properties of the manufactured multilayered plastic substrate were measured, and they are described in Table 2.

COMPARATIVE EXAMPLE 2-1

The plastic substrate having the same structure was manufactured by using the buffer coating composition that was prepared by using the same method as Example 2-1. However, the curing of the buffer coating composition was carried out by using only the thermal curing without the UV curing at 120° C. for 1 hour.

However, if the thermal curing was carried out after the first buffer layer was coated on one side of the PET film, since the symmetric structure was not obtained in the thickness direction of the film, a curl phenomenon occurred while the curing was carried out, and if the gas barrier layer and the second buffer layer were sequentially formed, it could be confirmed that the curl phenomenon became more serious. The physical properties of the manufactured multilayered plastic substrate were measured, and they are described in Table 2.

COMPARATIVE EXAMPLE 2-2

The plastic substrate having the same structure was manufactured by using the buffer coating composition that was prepared by using the same method as Example 2-1. However, the curing of the buffer coating composition was achieved by removing the solvent in the convection oven at 90° C. for 5 min, and carrying out the UV curing, and the thermal curing step was omitted.

In the case of when only the UV curing was carried out, the curing was not completely carried out, and thus, an attachment ability between the interfaces was lowered, such that the coated film having the low physical properties such as pencil hardness was manufactured.

The physical properties of the manufactured multilayered plastic substrate were measured, and they are described in Table 2. In Table 2, the measurement range of device a) was 0.05 cc/m²/day/atm, and the measurement range of the device b) was 0.005 g/m²/day.

a curable alicyclic epoxy resin comprising one or more of a compound of Formula 8, 9 or 10:

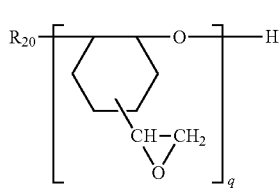

[Formula 8]

wherein $R_{20}$ is alkyl group or trimethylolpropane residual group and q is in the range of 1 to 20;

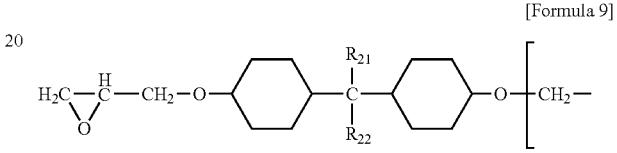

[Formula 9]

TABLE 2

| | Oxygen transmissivity[a] (cc/m²/day/atm) | Oxygen transmissivity[b] (g/m²/day) | Linear expansion coefficient (ppm/K) | Light transmissivity (400 nm) | Pencil hardness (200 g load) | Degree of bending | Note |
|---|---|---|---|---|---|---|---|
| Example 2-1 | <0.05 | <0.005 | 10 | 89% | 3H | No | — |
| Example 2-2 | <0.05 | <0.005 | 12 | 87% | 3H | No | Addition of the curing agent |
| Example 2-3 | <0.05 | <0.005 | 11 | 89% | 4H | No | Change of the composition |
| Example 2-4 | <0.05 | <0.005 | 12 | 87% | 4H | No | Addition of the inorganic material |
| Example 2-5 | <0.05 | <0.005 | 11 | 89% | 4H | No | Addition of the metal catalyst and the inorganic material |
| Comparative Example 2-1 | 0.21 | 0.16 | 13 | 80% | 4B | Serious | Performance of only thermal curing |
| Comparative Example 2-2 | 0.13 | 0.02 | 15 | 83% | H | Serious | Performance of only UV curing |

Through Table 2, in the case of Examples 2-1 to 2-5 according to the present invention, as compared to Comparative Examples 2-1 to 2-2, the oxygentransmissivity, steam transmissivity and linear expansion coefficient were low, the optical transmissivity was high, pencil hardness was excellent, and there was no deformation such as the curl phenomenon.

As described above, according to the present invention, it is possible to provide a multilayered plastic substrate that simultaneously satisfies improvement in high temperature thermal deformation according to low linear expansion coefficient and excellent dimensional stability and excellent gas barrier property.

The invention claimed is:

1. A multilayered plastic substrate comprising:
a polymer base having a single layer structure;
first buffer layers directly disposed on an upper side and directly disposed on a lower side of the polymer base, wherein the first buffer layers include a cured material that is formed from a mixture cured by UV curing and thermal curing, and wherein the mixture comprises:

-continued

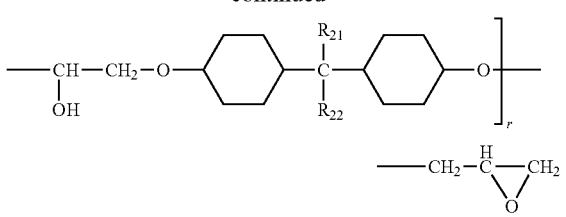

wherein $R_{21}$ and $R_{22}$ may be the same as or different from each other and each is H or $CH_3$, and r is 1 or 2;

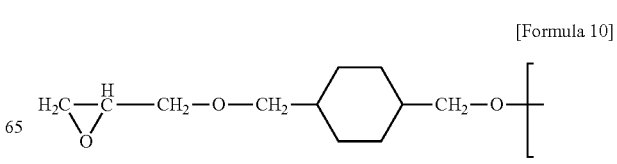

[Formula 10]

-continued

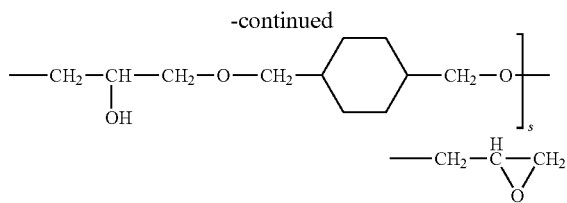

wherein s is in the range of 0 to 2; and
a hydrolysis material of at least one of organic silane and metal alkoxide and wherein on the basis of 100 parts by weight of the cured material, at least one hydrolysis material of the organic silane and the metal alkoxide is in the range of 5 to 95 parts by weight, and the curable epoxy resin is in the range of 5 to 95 parts by weight;
  wherein a content of uncured epoxy groups of the first buffer layer is 50 wt % to 90 wt %,
  wherein a linear expansion coefficient of the multilayered plastic substrate is in the range of 5 to 30 ppm/K,
  wherein a surface flatness (Ra) of the first buffer layer is 0.1 to 1.2 nm,
  wherein the thermal curing is carried out after the UV curing and at a temperature in the range of 150 to 200° C. for one hour, and
  wherein the organic silane is a mixture of tetraethoxysilane and glycidoxypropyltrimethoxysilane.

2. The multilayered plastic substrate as set forth in claim 1, wherein the polymer base includes at least one or more selected from the group consisting of a single polymer, two or more polymer blends, and a polymer complex material including organic or inorganic additives.

3. The multilayered plastic substrate as set forth in claim 2, wherein the single polymer or the polymer for two or more polymer blends includes at least one or more that are selected from the group consisting of polynorbornene, aromatic fluorene polyester, polyethersulfone, bisphenol-A polysulfone, polyimide, polyethyleneterephthalate, polyethylenenaphthalene, polyarylate, polycarbonate, and cyclic olefine copolymer.

4. The multilayered plastic substrate as set forth in claim 2, wherein the polymer complex material that includes the inorganic additive is a polymer-clay nanocomplex in which clay nanomaterials are dispersed in a polymer matrix.

5. The multilayered plastic substrate as set forth in claim 1, wherein the metal alkoxide includes at least one or more compounds of Formula 4:

$$M\text{-}(R^3)_z \qquad \text{[Formula 4]}$$

wherein M is a metal that is selected from the group consisting of aluminum, zirconium and titanium,
  $R^3$ may be each independently the same as or different from each other and halogen, alkyl having 1 to 12 carbon atoms, alkoxy, acyloxy, or hydroxyl group, and
  Z is an integer of 3 or 4.

6. The multilayered plastic substrate as set forth in claim 1, wherein at least one of the first buffer layer further includes at least one or more filling agents selected from the group consisting of metal, glass powder, diamond powder, silicon oxide, clay, calcium phosphate, magnesium phosphate, barium sulphate, aluminum fluoride, calcium silicate, magnesium silicate, barium silicate, barium carbonate, barium hydroxide and aluminum silicate; a curing agent, a catalyst and a solvent.

7. The multilayered plastic substrate as set forth in claim 1, wherein the thickness of the first buffer layer is in the range of 0.1 to 50 μm.

8. The multilayered plastic substrate as set forth in claim 1, further comprising a gas barrier layer having a thickness in the range of 5 to 1,000 nm.

9. The multilayered plastic substrate as set forth in claim 1, wherein oxygen transmissivity of the multilayered plastic substrate is less than 0.05 cc/m²/day/atm.

10. The multilayered plastic substrate as set forth in claim 1, wherein optical transmissivity of the multilayered plastic substrate is 85% or more.

11. The multilayered plastic substrate as set forth in claim 1, wherein steam transmissivity of the multilayered plastic substrate is less than 0.005 g/m²/day.

12. An electronic device comprising the multilayered plastic substrate according to claim 1.

* * * * *